Nov. 25, 1952    T. P. HALL    2,619,184
AUTOMOTIVE VEHICLE ADAPTED TO BE AIRBORNE
Filed Nov. 1, 1947    2 SHEETS—SHEET 1

Inventor
Theodore P. Hall
By
Sheldon F. Gerlach
Attorney

Nov. 25, 1952            T. P. HALL            2,619,184
AUTOMOTIVE VEHICLE ADAPTED TO BE AIRBORNE
Filed Nov. 1, 1947            2 SHEETS—SHEET 2
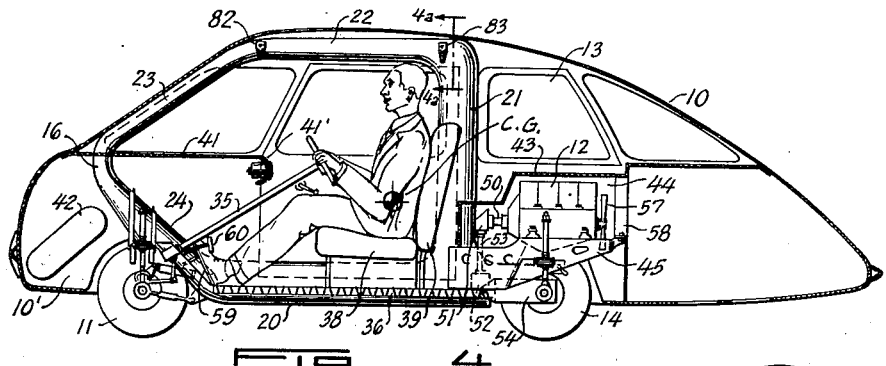
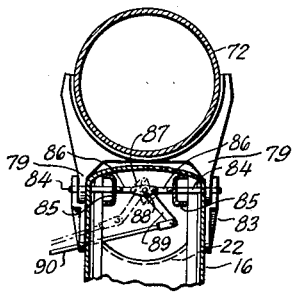
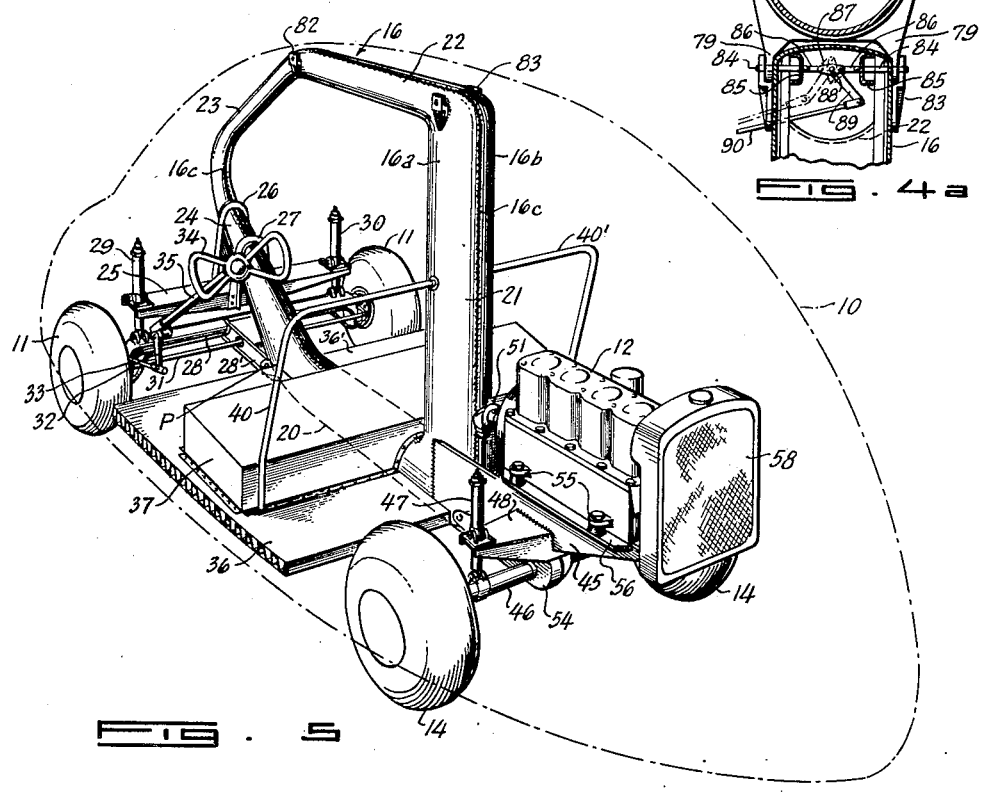
Inventor
Theodore P. Hall
By Glendon F. Gerlach
Attorney Patented Nov. 25, 1952

2,619,184

UNITED STATES PATENT OFFICE 2,619,184

AUTOMOTIVE VEHICLE ADAPTED TO BE AIRBORNE

Theodore P. Hall, San Diego, Calif.

Application November 1, 1947, Serial No. 783,543

1 Claim. (Cl. 180—54)

This invention relates to the structural arrangement of automotive vehicles adapted to be airborne, of the general type disclosed in my copending application Serial Number 763,859 filed July 26, 1947 and since issued as Patent Number 2,562,491 dated July 31, 1951.

The utility of the flying automobile is well recognized, but in striving to effect a vehicle of this type having a maximum of efficiency both as an aircraft and as a land vehicle, troublesome structural problems have heretofore been encountered by reason of the fact that the design criteria for aircraft are radically different than for automotive vehicles. In the design of aircraft it is particularly essential to minimize gross weight and reduce overall dimensions in order to obtain optimum performance. It has been found necessary in prior proposals for this type of vehicle to compromise the characteristics and design of the automotive unit in favor of considerations for the airborne assembly.

The present invention contemplates an automotive vehicle particularly adapted to be airborne, whose characteristics meet conventional automobile performance and strength specifications while being considerably lighter by reason of a novel arrangement of structural members supporting the necessary loads.

The primary object of the invention is to provide an automotive vehicle adapted to be airborne and in which stability, comfort, and safety characteristics are held to a maximum while weight is minimized through the arrangement of the structure and the distribution of loads.

Another object of the invention is to provide a ground vehicle adapted to be airborne having a high strength-weight ratio by virtue of a novel arrangement of load carrying members and by means of efficient load distribution.

A further object of the invention is to provide an automotive vehicle having a central unitary frame disposed substantially in a vertical plane passing through the fore-and-aft axis of the vehicle from which are supported all of the principal loads including the body, wheels, and power plant of the vehicle.

A still further object of the invention is to provide an automotive vehicle adapted to be airborne by attachment to a unitary flight component, and having a central vertical frame for supporting the principal loads of the automotive vehicle, and fitting means operatively associated with the frame for releasably connecting the flight component and transmitting the loads of the latter to the frame.

Other objects of the invention and its various characteristics and advantages will be readily apparent from consideration of the following detailed description and drawings, which form a part of this disclosure and in which like numerals of reference denote corresponding parts throughout the several views.

The invention consists in the several novel features which are hereinafter set forth and are more particularly defined by the claim at the conclusion hereof.

In the drawings:

Fig. 4 is a longitudinal section of the automotive vehicle illustrating the major elements and the arrangement of the principal structural members. Fig. 4a is a section on line 4a—4a of Fig. 4 showing the construction of the releasable connecting means;

Fig. 5 is a rear perspective view of the automotive vehicle with the body removed to more clearly illustrate the disposition of loads and arrangement of the structure.

Figure 3:
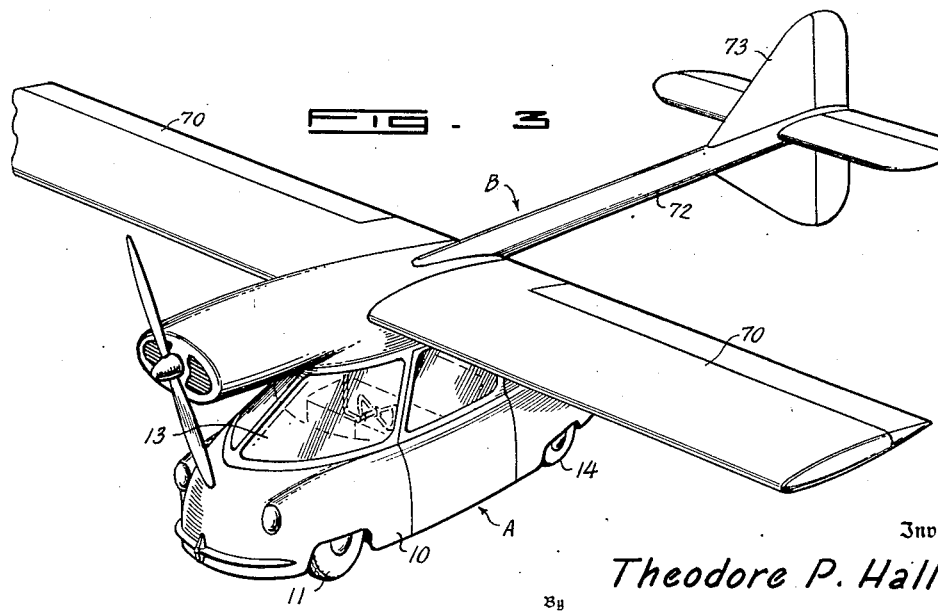
Fig. 3 is a perspective view of the automotive and flight components assembled in airborne relation.

The invention consists essentially of an automotive vehicle A designed and constructed to perform the conventional functions of an automobile, and which additionally may be airborne by releasable connection with a flight section B, the combined assembly being best illustrated in Fig. 3.

As illustrated, the automotive vehicle A of the invention is arranged for a driver and passenger in conventional side-by-side relationship, but if desired the principles of this invention may be embodied as advantageously in other seating arrangements accommodating additional passengers, or seats other than the operator's may be omitted and provision made for various dispositions of cargo. The automotive vehicle A may be designed to serve a number of purposes, for example, as a light delivery vehicle, or as an armored, reconnaissance, or ambulance car for military purposes. The principal objective of the invention, however, is to provide a safe, comfortable, ground vehicle having the utility of the conventional automobile and to be within practical limits of weight and size to permit it to be airborne. To this end, the vehicle A is provided with an enclosed shell-like body 10, a pair of forward steerable wheels 11, and a rearwardly disposed engine 12 for driving a pair of rear drive wheels 14.

The body portion 10 is of streamlined shape and is provided with front, side and rear windows 13 to permit optimum visibility. The external dimensions of the body 10 are somewhat less than for conventional automobiles of the same general capacity this being made possible without an attendant decrease in the internal dimensions by means of the arrangement of the internal structure and elements as explained herein. The reduction in overall size of the vehicle improves its maneuverability as an automobile and, of course, increases aerodynamic efficiency when airborne.

It is well understood in the automotive art that the center of gravity of a road vehicle should be located as low as possible for stability and as nearly as possible at the mid-point between the wheels to provide optimum riding characteristics. I have found that these conditions may be obtained by the disposition of the power plant 12 in the rear of the vehicle and the arrangement of the occupants, controls, structure, etc., so that the center of gravity approximates the position indicated in Fig. 4 by the symbol "C. G."

Because of the structural arrangement, the compact disposition of the elements, and the use of materials having high strength-weight ratios, the gross weight of the automotive vehicle as herein described is kept low in comparison to that of comparable automobiles of present design. For example, it has been found that a vehicle constructed in accordance with the principles of this invention may be designed to have a gross weight of approximately three hundred and fifty pounds. As a result of this considerable reduction in weight, a smaller power plant is permissible to provide speed and power equivalent to that of comparable automobiles, and this in itself contributes to weight reduction as well as economy of operation. I have determined that a vehicle embodying the present invention provides comparable performance when powered with an engine of 25–30 horsepower as against 85–100 horsepower engines used in present conventional automobiles of equivalent characteristics.

With particular reference to Figs. 4 and 5, the automotive vehicle is provided with a central D-shaped tubular frame 16 substantially disposed in a vertical plane passing through the fore-and-aft axis of the vehicle which serves to support all of the principal loads including that of the body 10, the wheels 11 and 14 and the power plant 12.

In the present embodiment, the frame 16 is illustrated as being a unitary structure of tubular cross-section which is formed from identical right-and-left-hand stampings 16$^a$ and 16$^b$ welded together at their edges in a seam 16$^c$ to form a single-piece, structurally rigid, assembly. This particular form of construction of the frame member 16 is advantageous in relatively high production but it is obvious that other means of fabricating this member may be employed without departing from the spirit of the invention. For example, the frame may be alternatively constructed from tubular sections built up of plates, angles, or channels welded or otherwise fastened together to form a strong central structure to support the principal loads.

In the following description of the frame 16 the term "members" is used to more clearly set forth the function of each of its components, even though in the single-piece frame illustrated in the drawings, these parts are integral portions of the same assembly. The D-shaped frame consists essentially of a lower longitudinal member 20, a vertical member 21 supported at its lower end from the longitudinal member 20, and a plurality of members 22, 23 and 24 interconnecting the upper end of the vertical member 21 to the longitudinal member 20 to form a rigid structure for supporting the principal loads of the automotive vehicle.

The longitudinal member 20 of the frame 16 is disposed between the rear drive wheels 14 and the steerable front wheels 11 substantially parallel to the fore-and-aft axis of the vehicle and in a vertical plane passing through it. The forwardly inclined member 24, integral with the longitudinal member 20 or rigidly secured to it, supports the front steerable wheels 11 through a channel 25 transversely secured to it by means of a pair of U-shaped clamp members 26 and 27. The steerable wheels 11 are rotatably supported on an axle 28 which is resiliently mounted for vertical movement in relation to the channel 25 by means of a pair of conventional hydraulic shock struts 29 and 30. The axle 28 is restrained against fore-and-aft movement by a link member 28$^1$ which is attached to the axle at its foreward end and pivotally supported at its rear end to the longitudinal member 20 by the pivotal connection P. The wheels 11 are pivotally interconnected by a tie rod 31, and steerable through a steering link 32 and steering arm 33, the latter being reciprocally movable in response to rotation of a steering wheel 34 supported by a steering column 35. The steering wheel 34 is conventionally located with respect to the operator's position in the vehicle.

The longitudinal member 20 extends rearwardly to a position somewhat forward of the rear wheels and at this position supports the vertical member 21 which is either integral with it as shown, or rigidly attached thereto. The vertical member 21 serves as a central column for transmitting the overhead loads and through interconnection with the members 22 and 23, an upper roof structure to support the body 10.

The body 10 is primarily a shell or sheath which supports only secondary loads, and which therefore can be built of a low weight material such as Duralumin or as an alternative, of a high-strength laminate such as, for example, fiber-glass cloth impregnated with a thermosetting resin. The body 10 is secured along its fore-and-aft centerline by suitable attachment to the members 22 and 23.

A pair of rigid unitary floor sections 36 and 36$^1$ is provided, attached at their inner edges to the longitudinal member 20, and at the outboard edges to the lower edges of the body 10 to brace the latter against side loads. The floor sections 36 and 36$^1$ may be constructed of Duralumin or of high strength laminate, and are preferably formed as a sandwich with an inner corrugated core and outer sheets, to promote stiffness and lateral rigidity.

A box-like seat structure 37 is securely attached transversely to the longitudinal member 20, forward of its intersection with the vertical member 21, and to the floor sections 36 and 36$^1$ along its edges to additionally brace the body 10 against side loads and to contribute to the lateral stiffness of the structure.

In assembly, suitably upholstered cushions 38 and 39 are provided as a seat and back respectively. The latter is held in place by attachment to a pair of tubular frames 40 and 40¹ extending from the vertical member 21 to the sides of the seat structure 37.

From the foregoing, it is apparent that the weight of the body 10 and the internal and external loads to which it is subjected in use, are primarily supported by the frame 16 in combination with the floor sections 36 and 36¹ and the seat structure 37, the latter elements bracing the body against lateral loads.

The body 10 is provided with a forward deck 41, having a depending portion 41¹ at its rearward edge forming an instrument panel and defining the operating compartment. A spare wheel and tire 42 is mounted in a forward space 10¹ within the body 10 and beneath the deck 41. A rear deck 43 is attached to the sides of the body 10 and the vertical member 21 to define an engine compartment 44 below it, and to serve as a shelf on its upper side for luggage.

The engine 12 and the drive wheels 14 with their mounting and suspension systems are supported by a rearwardly extending cantilever structure 45 which is suitably attached by bolts or welding to the frame 16 at the intersection of the longitudinal member 20 and the vertical member 21, in such a manner that the loads of the power plant and rear drive system are transmitted thereto.

The rear drive wheels 14 are provided with an axle housing 46 which is resiliently supported for vertical movement relative to the vehicle by hydraulic shock struts 47 (one only shown) mounted on a transverse channel member 48, which is in turn rigidly secured to the cantilever structure 45 so that the loads imposed on the rear wheels are transmitted to the frame 16.

The engine 12 is mounted by means of a series of lugs 55 to a flange 56 formed on the upper edge of the cantilever structure 45. In the present instance a water cooled type of engine is illustrated, mounted with its drive shaft 50 directed towards the front of the vehicle. Power from the engine is transmitted to the drive wheels 14 through upper and lower right angled drive units 51 and 52 respectively, an intermediate shaft 53 and a combined clutch, transmission, and differential gear assembly 54. Whereas the power plant arrangement, its support, and the drive elements may be varied without departing from the spirit of the invention, the method illustrated and herein described provides a particularly compact and efficient arrangement which is well adapted to the overall specifications and characteristics of the present vehicle.

It is evident that the engine 12 and the elements for driving the rear wheels 14 form a power plant which is supported from the cantilever structure 45, and that the loads imposed on the vehicle by the power plant are thus primarily transmitted to and supported by the frame 16.

Because of the relatively low power requirements of the vehicle of the present invention, ample power range may be obtained for all practical purposes by the use of a transmission 54 having but two speeds forward and one in reverse in distinction to the conventional automotive types in which the gross weights of the vehicle necessitate three speed ratios to obtain comparable performance. The use of a two-speed transmission contributes to weight reduction and simplifies driving control, since the automobile may be started and driven on level or moderate inclines without shifting gears, with the second or low speed being used only for unusual power demands.

Water cooling for the engine 12 is provided in the present embodiment by a conventional engine driven fan 57 and a radiator 58 which is supported by suitable brackets on the rear end of the cantilever structure 45.

The controls of the present vehicle are similar in location, operation, and function to those of conventional automobiles to eliminate need for additinal training in the use of the vehicle as an automobile and to fully utilize the normal reactions of the trained automobile driver. They include in addition to the steering wheel 34, a foot accelerator 59, a clutch pedal 60 operatively connected by suitable mechanism to the transmission 54 for response to actuation by the driver's left foot, a hand actuated gear shift, and a brake pedal located for operation by the right foot of the driver to control a conventional 4-wheeled brake system associated with the forward wheels 11 and drive wheels 14. In conformance with the other aspects of the vehicle of the present invention because of the general strength-weight efficiency of the whole structural arrangement, the brake system components may be smaller and consequently lighter, even though conventional in function.

Figure 2:
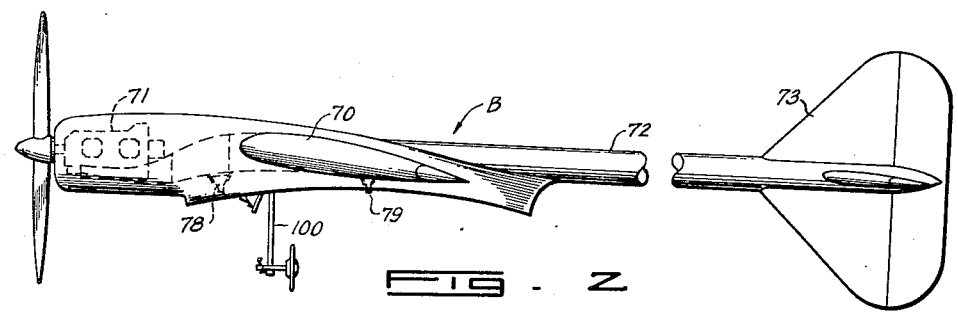
Fig. 2 is a side elevation of a typical flight component adapted to be releasably connected to the automotive vehicle to permit it to be airborne.

While the vehicle thus far described is comparable in every way with performance and characteristics of a conventional light automobile, it also conforms to the practical requirements for the passenger and load carrying portions of a light airplane, and is suited aerodynamically and from a weight standpoint to be airborne particularly when utilized in conjunction with a flight component B as shown in Figs. 2 and 3, although it is to be understood that this presents but one form of flight component, and that this may be varied or modified in many respects without departing from the scope of the invention. The flight component B in itself does not form a part of this invention and is shown herein only by way of illustration. The details of operation and construction of a particularly advantageous flight component for use in combination with the automotive vehicle of the present invention are described and claimed in my co-pending application, Serial Number 5,737 filed February 2, 1948. The flight component B as illustrated, consists essentially of a pair of main supporting surfaces or wings 70, a cowled tractor-mounted power plant 71, a tail boom 72, and an empennage 73.

The arrangement shown is particularly advantageous for the attachment of the flight component B to the automotive vehicle A, since the static loads of the flight component B as well as the aerodynamic loads imposed on it in flight are concentrated at the intersection of the wings 70, and tail boom 72, and may be readily transmitted to the frame 16 of the automotive vehicle through releasable connecting means located on the upper members thereof. This is accomplished by means of a pair of laterally spaced forward attachment fittings 78 and a pair of laterally spaced rear attachment fittings 79, both pairs of which are rigidly attached to the fore-and-aft structure of the flight component B. In the airborne assembly these fittings are adapted to extend through suitable openings 80 and 81 provided in the top of the automobile body 10, and engage mating fittings 82 and 83 integral with the upper member 22 of the frame 16 and are locked therewith to effect a positive and releasable connection between the automotive component A and the flight component B, serving also to locate positively the one with respect to the other.

Figure 1:
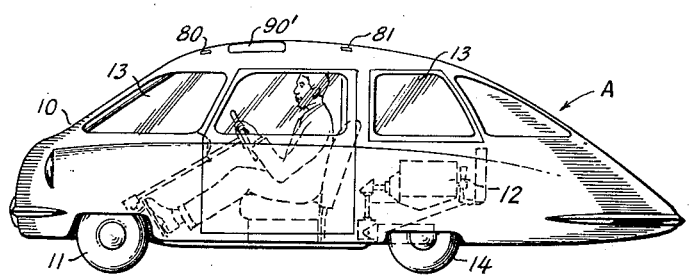
Fig. 1 is a side elevation of an automotive vehicle constructed in accordance with this invention.

In the connecting operation, the flight component B is suspended on jacks or by means of a hoist (not shown), and the automobile A is driven or positioned under it so that the forward and rear attachment fittings 78 and 79 are located over the attachment openings 80 and 81 (Fig. 1) provided in the top of the body 10. The flight component B is then lowered so that the attachment fittings 78 and 79 engage the mating fittings 82 and 83 located on the upper member 22 of the frame 16. A means is provided at each pair of fittings 82 and 83 to form a positive connection and lock with the attachment fittings 78 and 79. This is illustrated for the rear fittings in Fig. 4a in which a pair of pins 84, journaled in suitable bearing members 85, within the upper frame member 22 are extendable through aligned holes in the frame member 22 and the fittings 83 to engage corresponding holes in the attachment fittings 79. The pins 84 are attached through horizontally movable links 86 to a toggle 87. A similar locking arrangement is provided at the forward attachment fitting 78. The toggles at the front and rear attachment locations are fixed to a common shaft 88 suitably supported for rotation within the upper frame member 22. A bell crank 89 is fixed to the shaft 87 so that rotation thereof by a manually operable control rod 90 retracts or extends the pins to unlock or lock the automotive and flight components through the attachment fittings 78 and 79.

An important feature which is not in itself a part of the present invention but which is fully described and claimed in my co-pending application Serial No. 5,737 filed February 2, 1948, resides in the independency and arrangement of the operating controls for the flight component B from those of the automotive unit A. Since the foot pedal positions of the automotive vehicle are utilized for clutch and brake control I prefer to utilize a control system for the flight component in which the rubber and ailerons are combined and actuated through a single system. By so providing, complete flight control of the airborne vehicle can be provided from a single overhead type control column 100 which depends from and is supported by the flight component B, in such a manner that when the flight component B is in assembled relation to the automotive unit A, the control column 100 projects through a normally covered opening 90' in the body 10 and is positioned in proper relation to the operator to permit complete and effective flight control of the vehicle as an airplane.

The invention thus described exemplifies a light, compact automotive vehicle especially adapted to be airborne providing the equivalent characteristics and performance of the modern automobile in respect to strength, safety, comfort, ease of operation, and utility at greatly reduced gross weight and somewhat reduced overall dimensions. It is characterized by the use of a generally D-shaped frame member disposed vertically on the fore-and-aft axis of the vehicle, from which all of the principal loads are supported including the body, wheels, and power plant, and providing an efficient support and point of attachment for a suitable flight component. By reason of the support of the main loads through this control frame, an enclosed body which is primarily a shell made of high-strength low-weight materials, is used in combination with similarly constructed floor and seat sections to form a unitary body and frame assembly of high strength-weight efficiency.

While certain preferred embodiments of the invention have been specifically disclosed, it is understood that the invention is not limited thereto as many variations will be readily apparent to those skilled in the art and the invention is to be given its broadest possible interpretation within the terms of the following claim.

I claim:

In an automotive vehicle, in combination, a shell-like body including a roof structure forming upper side wall, a primary internal unitary structural frame, including; a horizontally disposed, longitudinal member at the lower side of said body substantially parallel to and in the vertical plane passing through the fore-and-aft axis of the vehicle, a vertical member supported at its lower end from said longitudinal member and being extended upwardly through substantially the full height of said body, a horizontally disposed, longitudinal member at the upper side of said body connected to the upper end of said vertical member and being extended forwardly therefrom above and in the vertical plane of said lower longitudinal member, and generally vertically disposed members connecting the spaced forward ends of said upper and lower longitudinal members, said upper longitudinal member constituting a support for the upper side of said body; a horizontally disposed structure supported from said primary structure and extending rearwardly from the lower end of said vertical frame member to constitute a cantilever support; a power plant mounted on said cantilever support structure within the body; forward ground engaging wheels mounted on and supported from said interconnecting members of said structural frame at the forward end of the body; ground engaging wheels mounted and supported from said cantilever support structure within the rear end of the body; and power transmission means from said power plant to said rear wheels for driving the latter.

THEODORE P. HALL.

REFERENCES CITED

The following references are of record in the file of this patent:

UNITED STATES PATENTS

| Number | Name | Date |
|---|---|---|
| 1,189,284 | Nelson | July 4, 1916 |
| 2,072,277 | Pogue | Mar. 7, 1937 |
| 2,132,529 | Firner | Oct. 11, 1938 |
| 2,135,073 | Gerhardt | Nov. 1, 1938 |
| 2,183,323 | Moss | Dec. 12, 1939 |
| 2,215,003 | Johnson | Sept. 17, 1940 |
| 2,316,622 | Richard | Apr. 13, 1943 |
| 2,389,907 | Helmuth | Nov. 27, 1945 |
| 2,430,869 | Fulton | Nov. 18, 1947 |

FOREIGN PATENTS

| Number | Country | Date |
|---|---|---|
| 375,281 | Italy | Sept. 30, 1939 |
| 559,819 | Great Britain | Mar. 7, 1944 |